United States Patent [19]
Nakajima et al.

[11] Patent Number: 6,051,651
[45] Date of Patent: Apr. 18, 2000

[54] CHLOROFLUOROCARBON RESISTANT RESIN COMPOSITION AND A REFRIGERATOR INNER CASING FORMED FROM THE SAME COMPOSITION

[75] Inventors: Osamu Nakajima, Settsu; Michio Hoshikawa, Amagasaki; Tetsuya Yamamoto, Niihama; Hiromichi Aoki, Settsu; Hiroshi Kojima, Niihama, all of Japan

[73] Assignee: Nippon A&L Inc., Osaka, Japan

[21] Appl. No.: 09/109,158

[22] PCT Filed: Jan. 5, 1996

[86] PCT No.: PCT/JP96/00005

§ 371 Date: Jul. 2, 1998

§ 102(e) Date: Jul. 2, 1998

[87] PCT Pub. No.: WO97/25376

PCT Pub. Date: Jul. 17, 1997

[51] Int. Cl.[7] .................................................. C08G 63/48
[52] U.S. Cl. ................................................................ 525/71
[58] Field of Search ................................................ 525/71

[56] References Cited

U.S. PATENT DOCUMENTS

| | | | |
|---|---|---|---|
| 3,928,494 | 12/1975 | Aliberti | 260/876 |
| 4,556,692 | 12/1985 | Kishida | 525/78 |
| 5,336,720 | 8/1994 | Richards | 525/78 |
| 5,633,304 | 5/1997 | Kulich | 524/284 |
| 5,674,940 | 10/1997 | Eichenauer | 525/71 |
| 5,708,082 | 1/1998 | Huang | 525/87 |

FOREIGN PATENT DOCUMENTS

| | | |
|---|---|---|
| 62-167348 | 7/1987 | Japan . |
| 2-117942 | 5/1990 | Japan . |
| 2-175745 | 7/1990 | Japan . |
| 2-284906 | 11/1990 | Japan . |
| 3-124757 | 5/1991 | Japan . |
| 5-17540 | 1/1993 | Japan . |
| 5-17541 | 1/1993 | Japan . |
| 5-17658 | 1/1993 | Japan . |
| 5-155949 | 6/1993 | Japan . |
| 6-179796 | 6/1994 | Japan . |
| 6-228409 | 8/1994 | Japan . |

OTHER PUBLICATIONS

Chemical Abstracts, vol. 119, No. 4, Jul. 26, 1993, Abstract No. 29547.

Chemical Abstracts, vol. 122, No. 24, Jun. 12, 1995, Abstract No. 292456.

*Primary Examiner*—Paul R. Michl
*Attorney, Agent, or Firm*—Sughrue, Mion, Zinn, Macpeak & Seas, PLLC

[57] ABSTRACT

The invention relates to a chlorofluorocarbon resistant resin composition characterized by comprising an agglomerated graft polymer (Y) occurring in clusters having a weight average particle diameter of 0.8–2.0 $\mu$m as formed from a small particle diameter graft polymer (y) obtained in a grafting degree of 10–40 weight % by polymerizing 60–20 weight % of a monomer mixture comprising 30–45 weight % of a vinyl cyanide compound and 70–55 weight % of an aromatic vinyl compound in the presence of 40–80 weight % of a rubber like polymer having a weight average particle diameter of 0.05–0.2 $\mu$m and a copolymer (Z) obtained by polymerizing 35–45 weight % of a vinyl cyanide compound with 65–55 weight % of an aromatic vinyl compound and having an intrinsic viscosity of 0.6–0.9, the rubber like polymer accounting for 15–25 weight % of the total composition. The resin composition of the invention is superior to the conventional resin composition in chlorofluorocarbon resistance.

5 Claims, 1 Drawing Sheet

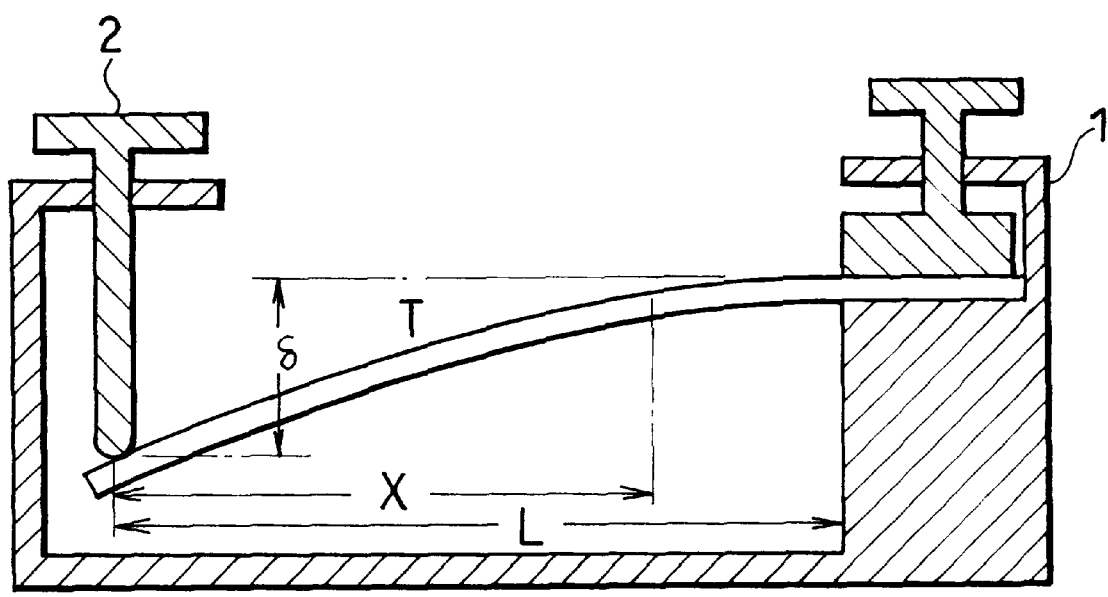
F I G. 1

CHLOROFLUOROCARBON RESISTANT RESIN COMPOSITION AND A REFRIGERATOR INNER CASING FORMED FROM THE SAME COMPOSITION

TECHNICAL FIELD

The present invention relates to a chlorofluorocarbon resistant resin composition and a refrigerator inner casing formed from the same composition. More particularly, the invention relates to a resin composition suitable for the production of a refrigerator inner casing by the polyurethane foaming technique using a substitute for CFC-11 as a blowing agent and to the refrigerator inner casing formed from the same composition.

BACKGROUND ART

The inner casing of a cold insulating cabinet for a refrigerator, freezer, or ice-making machine has been conventionally manufactured using an impact resistant polystyrene (HIPS) resin or ABS (acrylonitrile-butadiene rubber-styrene) resin and, as an insulation material, a polyurethane foam produced using trichloromonofluoromethane (CFC-11) as the blowing agent.

ABS resin in particular is an optimal inner casing material for said insulating cabinet not only from the standpoints of mechanical properties and processability but also in terms of adhesion to polyurethane foam and stress characteristics on contact with CFC-11 or exposure to the heating-cooling cycle of urethane foam production. However, in view of the recent rigorous control over the production and use of ozonosphere-destroying substances including CFC-11, new blowing agents have been explored. Among the substitutes for CFC-11 so far proposed are 1,1-dichloro-2,2,2-trifluoroethane (HCFC-123) and 1,1-dichloro-1-fluoroethane (HCFC-141b) but since these substitutes are more polar than CFC-11, the ABS resin heretofore available is ready to undergo cracking upon contact with these substitutes.

Thus far, a technique comprising increasing the proportion of the rubber or acrylonitrile component of ABS resin has been proposed. However, increasing the rubber component (Japanese Unexamined Patent Publication No. 132712/1992) sacrifices the rigidity of resin, while increasing the proportion of acrylonitrile (Japanese Unexamined Patent Publication No. 170409/1992, Japanese Unexamined Patent Publication No. 17540/1993, Japanese Unexamined Patent Publication No. 17541/1993) detracts from the excellent mechanical properties and thermal stability of ABS resin. An ABS resin containing an ester of methacrylic acid as a comonomer unit has also been proposed (Japanese Unexamined Patent Publication No. 126756/1992) but this resin is not only inadequate in chlorofluorocarbon resistance but, just as it is the case with the above ABS resin enriched for acrylonitrile, has the disadvantage that the inherently excellent mechanical properties of ABS resin are sacrificed.

Technologies in which ABS resin is formulated with other polymers have also been proposed. For example, incorporation of thermoplastic polyester elastomers (Japanese Unexamined Patent Publication No. 132762/1992, Japanese Unexamined Patent Publication No. 170451/1992), addition of a higher fatty acid triglyceride to acrylonitrile-enriched ABS resin (Japanese Unexamined Patent Publication No. 154858/1992), the use of acrylonitrile-enriched acrylic rubber-modified graft and butadiene rubber-modified graft in combination (Japanese Unexamined Patent Publication No. 170460/1992), the use of ethylene-propylene rubber-modified graft and butadiene rubber-modified graft in combination (Japanese Unexamined Patent Publication No. 170461/1992), the use of ethylene-propylene rubber-modified graft and acrylic rubber-modified graft in combination (Japanese Unexamined Patent Publication No. 170462/1992), and addition of a polyester (Japanese Unexamined Patent Publication No. 17658/1993) can be mentioned by way of example. Although these technologies certainly contribute to chlorofluorocarbon resistance, none of them are fully satisfactory in the effect achieved.

In addition, the use of an agglomerate for the rubber or graft component of ABS resin has also been proposed. Thus, the technology employing an agglomerated rubber as the rubber component (Japanese Examined Patent Publication No. 30034/1977), the technology which comprises grafting a small proportion of a compound to the rubber component (a low grafting degree) and causing the resulting graft polymer to undergo agglomeration and enlargement (Japanese Examined Patent Publication No. 27378/1990), and the technology which comprises grafting a small proportion of a compound to the rubber component, causing the resulting graft polymer to undergo agglomeration and enlargement to form clusters, and finally grafting a larger amount of the compound (Japanese Unexamined Patent Publication No. 25227/1993) can be mentioned by way of example. These technologies are also contributory to enhanced chlorofluorocarbon resistance but are never fully satisfactory.

There has, thus, been a long-standing need for a new material having improved chlorofluorocarbon resistance (i.e. not easily undergoing cracking on contact with said substitutes) without being compromised in the characteristically excellent mechanical properties, thermal stability and processability of ABS resin.

DISCLOSURE OF INVENTION

It is an object of the present invention to provide a resin composition superior to the conventional composition in chlorofluorocarbon resistance.

It is another object of the present invention to provide a material having very satisfactory chlorofluorocarbon resistance and surface gloss.

It is a further object of the present invention to provide a resin composition suitable for the production of inner casings for insulating cabinets employing substitute chlorofluorocarbons such as HCFC-123 and HCFC-141b.

It is a still further object of the present invention to provide a refrigerator inner casing with improved chlorofluorocarbon resistance and surface gloss.

The inventors of the present invention found that a composition comprising a large particle diameter graft polymer comprising cluster shaped agglomerates of a graft polymer made by using a small particle diameter rubber and a copolymer is a highly chlorofluorocarbon resistant material and have perfected the present invention.

Thus, the first aspect of the present invention is concerned with a chlorofluorocarbon resistant resin composition characterized by comprising an agglomerated graft polymer (Y) occurring in clusters having a weight average particle diameter of 0.8–2.0 μm as formed from a small particle diameter graft polymer (y) obtained in a grafting degree of 10–40 weight % by polymerizing 60–20 weight % of a monomer mixture comprising 30–45 weight % of a vinyl cyanide compound and 70–55 weight % of an aromatic vinyl compound in the presence of 40–80 weight % of a rubber like polymer having a weight average particle diameter of 0.05–0.2 μm and a copolymer (Z) obtained by polymerizing 35–45 weight % of a vinyl cyanide compound with 65–55 weight % of an aromatic vinyl compound and having an intrinsic viscosity of 0.6–0.9, the proportion of said rubber like polymer being 15–25 weight % of the composition.

The second aspect of the present invention is concerned with a chlorofluorocarbon resistant refrigerator inner casing formed from said resin composition.

The inventors of the present invention further discovered that a composition comprising a graft polymer obtained by using a medium particle diameter rubber, a large particle diameter graft polymer comprising cluster shaped agglomerates of a graft polymer made by using a small particle diameter rubber, and a copolymer is a material having excellent mechanical properties, thermal stability, processability and surface appearance (gloss) as well as extremely high chlorofluorocarbon resistance and have accordingly perfected the present invention.

The third aspect of the present invention is, therefore, concerned with a chlorofluorocarbon resistant resin composition characterized by comprising a graft polymer (X) obtained by polymerizing 80–20 weight % of a monomer mixture comprising 20–40 weight % of a vinyl cyanide compound and 80–60 weight % of an aromatic vinyl compound in the presence of 20–80 weight % of a rubber like polymer having a weight average particle diameter of 0.4–0.6 μm, an agglomerated graft polymer (Y) comprising cluster shaped agglomerates and having a weight average particle diameter of 0.8–2.0 μm as formed from a small particle diameter graft polymer (y) obtained in a grafting degree of 10–40 weight % by polymerizing 60–20 weight % of a monomer mixture comprising 30–45 weight % of a vinyl cyanide compound and 70–55 weight % of an aromatic vinyl compound in the presence of 40–80 weight % of a rubber like polymer having a weight average particle diameter of 0.05–0.2 μm, and a copolymer (Z) obtained by polymerizing 35–45 weight % of a vinyl cyanide compound with 65–55 weight % of an aromatic vinyl compound and having an intrinsic viscosity of 0.6–0.9, the weight ratio of the rubber like polymer in said graft polymer (X) to the rubber like polymer in said agglomerated graft polymer (Y) being 1:1–4 and the total proportion of said rubber like polymers being 15–25 weight %.

The fourth aspect of the present invention is concerned with a chlorofluorocarbon resistant refrigerator inner casing formed from the resin composition described just above.

The present invention is now described in detail.

1. The first and second aspects of the present invention

[Rubber like polymer]

The rubber like polymer that can be used as a constituent of graft polymer (Y) includes conjugated diene rubbers such as polybutadine, butadiene-styrene polymer, butadiene-acrylonitrile polymer, etc., ethylene-α-olefin rubbers such as ethylene-propylene polymer, ethylene-propylene-non conjugated diene (e.g. ethylidenenorbornene, dicyclopentadiene, etc.) polymer, ethylene-butylene polymer, etc., polyisoprene, poly(butyl acrylate), ethylene-vinyl acetate polymer, chlorinated polyethylene, hydrogenated butadiene-styrene polymer (SEBS), etc. and these polymers can be used singly or in combination. Particularly preferred are conjugated diene rubbers and ethylene-α-olefin rubbers.

[Vinyl cyanide compound and aromatic vinyl compound]

The vinyl cyanide compound that can be used as a constituent of graft polymer (Y) and of copolymer (Z) includes acrylonitrile, methacrylonitrile, fumaronitrile, etc. and these compounds can be used singly or in combination. Particularly preferred is acrylonitrile. The aromatic vinyl compound that can be employed includes styrene, α-methylstyrene, o-methylstyrene, m-methylstyrene, p-methylstyrene, t-butylstyrene, α-methylvinyltoluene, dimethylstyrene, chlorostyrene, dichlorostyrene, bromostyrene, dibromostyrene, vinylnaphthalene, etc. and these compounds can be used singly or in combination. Particularly preferred is styrene.

Furthermore, within the extent not conflicting with the objects of the present invention, said aromatic vinyl compound can be partially replaced with one or more alkyl esters of unsaturated carboxylic acids, such as methyl acrylate, methyl methacrylate, ethyl acrylate, ethyl methacrylate, propyl acrylate, propyl methacrylate, 2-ethylhexyl acrylate, 2-ethylhexyl methacrylate, etc., or maleimide compounds such as maleimide, methylmaleimide, ethylmaleimide, N-phenylmaleimide, O-chloro-N-phenylmaleimide, etc.

[Graft polymer (Y)]

Graft polymer (Y) is a graft polymer occurring as agglomerates of a small particle diameter graft polymer (y) with a grafting degree of 10–40 weight % in the form of clusters having a weight average particle diameter of 0.8–2.0 μm as obtained by polymerizing 60–20 weight % of a monomer mixture comprising 30–45 weight % of said vinyl cyanide compound and 70–55 weight % of said aromatic vinyl compound in the presence of 40–80 weight % of said rubber like polymer having a weight average particle diameter of 0.05–0.2 μm. The term "clusters" as used herein means a morphology resembling bunches of grapes or raspberries.

If the weight average particle diameter of the rubber like polymer be less than 0.05 μm, the chlorofluorocarbon resistance of the composition would not be adequate. On the other hand, if the limit of 0.2 μm be exceeded, the objective of improved chlorofluorocarbon resistance could not be accomplished. Moreover, if the proportion of the rubber like polymer be less than 40 weight %, the small particle diameter graft polymer (y) could not be formed into clusters so that no improvement in chlorofluorocarbon resistance could be accomplished. Should the limit of 80 weight % be exceeded, the chlorofluorocarbon resistance of the final composition would be poor.

On the other hand, if the proportion of the vinyl cyanide compound be less than 30 weight % (stated differently, if the proportion of the aromatic vinyl compound be over 70 weight %), the chlorofluorocarbon resistance of the final composition would be poor. Conversely if the limit of 45 weight % be exceeded (stated differently, if the proportion of the aromatic vinyl compound be less than 55 weight %), the thermal stability of the small particle diameter graft polymer (y) would be insufficient.

The grafting degree, which represents the quantity of the vinyl cyanide compound and aromatic vinyl compound bound to the rubber like polymer, is 10–40 weight %. The grafting degree is determined by fractionation into acetone soluble and insoluble fractions and application of the following equation.

Grafting degree (%)=[(weight of acetone insoluble fraction−weight of rubber like polymer in graft polymer) ÷weight of rubber like polymer in graft polymer]×100

If the grafting degree be less than 10 weight %, the chlorofluorocarbon resistance would be poor. Should it exceed 40 weight %, the graft polymer (y) would not form clusters so that no improvement in chlorofluorocarbon resistance would be accomplished. The grafting degree can be adjusted by varying the polymerization conditions such as polymerization temperature, mode of addition of compounds, polymerization charge composition, etc. in a suitable way.

Furthermore, the small particle diameter graft polymer (y) can be prepared by any of the known emulsion polymerization, suspension polymerization, solution polymerization and bulk polymerization processes or a combination of such processes. In the polymerization process, conventional polymerization auxiliaries such as a molecular weight modifier, an initiator, etc. can be employed.

The preferred polymerization technology is an emulsion polymerization process and the preferred emulsifying agent includes alkali metal salts of rosin acids or higher fatty acids. The preferred molecular weight modifier includes mercaptans and terpinolene, and the preferred initiator includes redox initiators including hydroperoxides as well as persulfates.

The vinyl cyanide compound and aromatic vinyl compound are added to the polymerization system preferably in a continuous addition over a period of 1–7 hours. The preferred graft polymerization reaction temperature is 40–90° C.

The small particle diameter graft polymer (y) having the above composition and structure undergoes agglomeration to form clusters in the granulation and molding process to give an agglomerated graft polymer in the form of clusters or bunches. Thus, the small particle diameter graft polymer agglomerates when heated into a molten state.

The agglomerated graft polymer according to the present invention is in the form of clusters. With the known doughnut shaped graft polymer, no satisfactory chlorofluorocarbon resistance can be obtained. The weight average particle diameter of the agglomerated graft polymer is 0.8–2.0 $\mu$m. If the diameter be less than 0.8 $\mu$m, the chlorofluorocarbon resistance would be poor. If the limit of 2.0 $\mu$m be exceeded, the surface appearance (gloss) would be undesirably poor. The weight average particle diameter of the agglomerates can be determined by measuring the major and minor diameters of each agglomerate on an electron micrograph and, assuming the average of said two diameters as the particle diameter, calculating the average particle diameter from the particle diameters of at least 10 agglomerates.

The graft polymer preferred from the standpoints of chlorofluorocarbon resistance and mechanical properties is a graft polymer in the form of clusters having a weight average particle diameter of 0.8–2.0 $\mu$m as formed from a small particle diameter graft polymer obtained by polymerizing 50–40 weight % of a monomer mixture comprising 35–40 weight % of a vinyl cyanide compound and 65–60 weight % of an aromatic vinyl compound in the presence of 50–60 weight % of a rubber like polymer having a weight average particle diameter of 0.05–0.2 $\mu$m.

[Copolymer (Z)]

Copolymer (Z) for use in the present invention is a copolymer obtained by polymerizing 35–45 weight % of a vinyl cyanide compound with 65–55 weight % of an aromatic vinyl compound and having an intrinsic viscosity of 0.6–0.9.

If the proportion of the vinyl cyanide compound be less than 35 weight % (stated differently, if the proportion of the aromatic vinyl compound exceeds 65 weight %), no improvement in chlorofluorocarbon resistance would be obtained. If the limit of 45 weight % be exceeded (stated differently, if the proportion of the aromatic vinyl compound be less than 55 weight %), the thermal stability would be undesirably low.

Moreover, if the intrinsic viscosity of the copolymer be less than 0.6, no improvement in chlorofluorocarbon resistance could be realized, while an intrinsic viscosity over 0.9 results in poor processability. The intrinsic viscosity of the copolymer is the value found by preparing a concentration series (0.1–0.5 weight %) of the copolymer in dimethylformamide, measuring the respective specific viscosity values using a viscosity tube at 30° C., and determining the viscosity value at 0 weight % concentration from the specific viscosity-concentration relation.

From the standpoints of the chlorofluorocarbon resistance, mechanical properties and thermal stability of the composition and the shaped product, as well as sheet-forming characteristics, the particularly preferred copolymer is a copolymer obtained by polymerizing 35–40 weight % of a vinyl cyanide compound with 65–60 weight % of an aromatic vinyl compound and having an intrinsic viscosity of 0.7–0.8.

The intrinsic viscosity can be adjusted by varying the polymerization conditions such as the types and amounts of molecular weight modifier and initiator, polymerization temperature, mode of addition of the compounds, the charge composition in a suitable manner.

Copolymer (Z) can be prepared by any of the known emulsion polymerization, suspension polymerization, solution polymerization, and bulk polymerization processes or a combination of such processes. In the polymerization process, various known polymerization aids such as molecular weight modifier and initiators can be employed.

The preferred polymerization process is emulsion polymerization or bulk polymerization.

The preferred emulsifier for use in the emulsion polymerization process includes alkali metal salts of rosin acids or higher fatty acids. The preferred molecular weight modifier includes mercaptans and terpinolene, and the preferred initiator includes redox initiators inclusive of hydroperoxides as well as persulfates. The preferred mode of addition of the vinyl cyanide compound and aromatic vinyl compound is continuous addition over a period of 1–7 hours. The preferred copolymerization temperature is 40–90° C.

The bulk polymerization process is preferably carried out using a small quantity of ethylbenzene as the solvent. The preferred monomer conversion rate is 30–80 weight %. The initiator is not used (thermal polymerization) or, when used, is preferably a diacyl peroxide. The preferred copolymerization reaction temperature is 50–150° C.

[Composition]

The resin composition according to the first aspect of the present invention comprises the above described graft polymer (Y) and copolymer (Z). The agglomeration status of the graft polymer in the composition can be evaluated by visual inspection of the cross-section of a sheet prepared by hot pressing the composition with the aid of an electron microscope.

There is no particular limitation on the relative amount of graft polymer (Y) and copolymer (Z) but the rubber like polymer should account for 15–25 weight % of the total composition. If the proportion be less than 15 weight %, both impact strength and chlorofluorocarbon resistance would be inadequate. If the limit of 25 weight % be exceeded, rigidity (flexural modulus) and processability would be undesirably poor. From the standpoints of chlorofluorocarbon resistance and mechanical properties, the range of 20–25 weight % is particularly preferred.

The mode of mixing graft polymer (y) with copolymer (Z) is not so critical. Thus, they can be mixed in aqueous dispersion (latex form) or in any of powder, bead and pellet forms. The order of mixing is not restricted, either. As to the melt kneading procedure, any of the known techniques using a Bumbury mixer, a roll mixer, an extruder or the like can be employed. In the mixing stage, a variety of additives such as an antioxidant, ultraviolet absorber, antistatic agent, lubricant, dye, pigment, plasticizer, flame retardant, release agent, etc. can be incorporated.

The refrigerator inner casing according to the second aspect of the present invention can be manufactured by a process which comprises extruding the above described resin composition into a sheet and vacuum forming the sheet into the product or a process comprising a direct injection molding of the resin composition.

2. The third and fourth aspects of the invention

[Graft polymer (X)]

The graft polymer (X) for the third aspect of the invention is a graft polymer which can be obtained by polymerizing 80–20 weight % of a monomer mixture comprising 20–40 weight % of vinyl cyanide compound and 80–60 weight % of aromatic vinyl compound in the presence of 20–80 weight % of a rubber like polymer having a weight average particle diameter of 0.4–0.6 µm.

For typical species of the rubber like polymer, the vinyl cyanide compound and the aromatic vinyl compound, reference can be made to those mentioned for the first invention.

If the weight average particle diameter of the rubber like polymer be less than 0.4 µm, poor impact resistance would result. If the limit of 0.6 µm be exceeded, no improvement in chlorofluorocarbon resistance would be attained. Moreover, if the proportion of the rubber like polymer be less than 20 weight %, impact resistance would be sacrificed. If the limit of 80 weight % be exceeded, rigidity (flexural modulus) would be undesirably poor.

If the proportion of the vinyl cyanide compound be less than 20 weight % (stated differently, if that of the aromatic vinyl compound exceeds 80 weight %), no improvement in chlorofluorocarbon resistance would be obtained. Should it be over 40 weight % (stated differently, if the proportion of the aromatic vinyl compound be less than 60 weight %), thermal stability would be undesirably poor.

From the standpoints of chlorofluorocarbon resistance, mechanical properties, and thermal stability, the preferred graft polymer is one that can be obtained by polymerizing 60–40 weight % of a monomer mixture comprising 25–30 weight % of vinyl cyanide compound and 75–70 weight % of aromatic vinyl compound in the presence of 40–60 weight % of a rubber like polymer having a weight average particle diameter of 0.4–0.5 µm.

There is no limitation on the grafting degree which represents the amount of vinyl cyanide and aromatic vinyl compounds bound to the rubber like polymer but from the standpoints of chlorofluorocarbon resistance, mechanical properties, and thermal stability, the range of 30–70 weight % is preferred.

Graft polymer (X) can be prepared by any of the known emulsion polymerization, suspension polymerization, solution polymerization, and bulk polymerization processes or a suitable combination of such processes. In the polymerization process, various known polymerization aids such as molecular weight modifier and initiators can be employed.

The preferred polymerization technology is an emulsion polymerization process and the preferred emulsifying agent includes alkali metal salts of rosin acids or higher fatty acids. The preferred molecular weight modifier includes mercaptans and terpinolene, and the preferred initiator includes redox initiators including hydroperoxides as well as persulfates.

The vinyl cyanide compound and aromatic vinyl compound are added to the polymerization system preferably in a continuous addition over a period of 1–7 hours. The preferred graft reaction temperature is 40–90° C.

[Graft polymer (Y)]

What has been described for the graft polymer in the first aspect of the present invention is applicable to this graft polymer (Y).

If the grafting degree be less than 10 weight %, both chlorofluorocarbon resistance and surface appearance (gloss) would be poor. If the limit of 40 weight % be exceeded, the graft polymer (y) would not form clusters so that no improvement in chlorofluorocarbon resistance would be accomplished.

[Copolymer (Z)]

What has been described for the first aspect of the invention applies to this copolymer.

[Composition]

The resin composition of this invention comprises the above described graft polymer (X), graft polymer (Y), and copolymer (Z).

The weight ratio of the rubber like polymer in graft polymer (X) to the rubber like polymer in graft polymer (Y) is 1:1–4. If the ratio be smaller than 1 (stated differently, if the weight of the rubber like polymer in Y be less than the weight of the rubber like polymer in X), chlorofluorocarbon resistance would be inadequate. If the limit of 4 be exceeded (stated differently, if the weight of the rubber like polymer in Y be more than 4 times the weight of the rubber like polymer in X), surface appearance (gloss) would be undesirably poor. The particularly preferred weight ratio is 1:1.5–3.

The total amount of the rubber like polymer (the combined amount of rubber like polymers in graft polymer (X) and graft polymer (Y)) in the composition should be 15–25 weight %. If the amount be less than 15 weight %, both the impact resistance and chlorofluorocarbon resistance would be insufficient. If the limit of 25% be exceeded, rigidity (flexural modulus) and processability would be undesirably poor. From the standpoints of chlorofluorocarbon resistance and mechanical properties, the range of 20–25 weight % is particularly useful.

There is no particular limitation on the mode of mixing graft polymer (X), graft polymer (y) and copolymer (Z). Thus, they can be mixed in aqueous dispersion (latex form) or in any of powder, bead, pellet and other forms. There is no limitation on mixing order, either. Thus, the three components may be admixed together in one operation or any two of them may be admixed and the remaining component be then added. As to the melt kneading procedure, any of the known techniques using a Bumbury mixer, a roll mixer, an extruder or the like can be employed. In the mixing stage, a variety of additives such as an antioxidant, ultraviolet absorber, antistatic agent, lubricant, dye, pigment, plasticizer, flame retardant, release agent, etc. can be incorporated.

The refrigerator inner casing according to the fourth aspect of the present invention can be manufactured by a process which comprises extruding the above described resin composition into a sheet and vacuum forming the sheet into the product or a process comprising a direct injection molding of the resin composition.

The resin composition according to the present invention is superior to the conventional resin composition in chlorofluorocarbon resistance. Therefore, the composition is of great utility value as a material for the fabrication of the inner casing of a refrigerator or freezer which utilizes a substitute chlorofluorocarbon (e.g. HCFC-141b).

BRIEF DESCRIPTION OF DRAWINGS

FIG. 1 is a schematic view showing an apparatus for measuring the critical strain of a shaped article.

BEST MODE FOR CARRYING OUT THE INVENTION

The following examples are intended to describe the present invention in further detail. It should be understood that all parts and % are by weight.

Reference Example 1

Production of a rubber like polymer for graft polymer (X)

A stainless steel reactor equipped with a stirrer means was charged with 90 parts of butadiene, 10 parts of styrene, 0.5 part of sodium oleate, 0.2 part of dodecylmercaptan, 0.3 part of potassium persulfate, 0.1 part of sodium hydroxide and 95 parts of deionized water and the polymerization reaction was carried out at 60° C. for 18 hours and, then, at 70° C. for 15 hours. The weight average particle diameter of the resulting rubber like polymer was 0.45 µm.

Reference Example 2

Production of a rubber like polymer for graft polymer (y)

Except that sodium oleate and deionized water were used in the proportions of 1.5 parts and 170 parts, respectively, the same procedure as Reference Example 1 was repeated to provide a rubber like polymer having a weight average particle diameter of 0.15 µm.

Reference Example 3

Production of an agglomerated rubber like polymer for a graft polymer

The rubber like polymer latex having a weight average particle diameter of 0.15 µm as produced in Reference Example 2 was adjusted to pH 3 with an aqueous solution (5%) of phosphoric acid under constant stirring. Then, an aqueous solution (25%) of sodium hydroxide was added to the above latex to provide an agglomerated rubber like polymer as clusters having a weight average particle diameter of 0.80 µm.

Reference Example 4

Production of graft polymer (X)

An autoclave equipped with a reflux condenser was charged with 100 parts of the rubber like polymer latex (solid content 50%) having a weight average particle diameter of 0.45 µm as obtained in Reference Example 1 and an aqueous solution prepared by dissolving 0.1 part of dextrin, 0.1 part of anhydrous sodium pyrophosphate and 0.005 part of ferrous sulfate in 80 parts of deionized water and, after the gaseous phase was replaced with nitrogen gas, the temperature was increased to 70° C.

After the internal temperature had reached 70° C., a mixture of 14 parts of acrylonitrile, 36 parts of styrene, 0.2 part of t-dodecylmercaptan and 0.3 part of cumene hydroperoxide and an emulsifying solution containing 1.5 parts of potassium oleate in 20 parts of deionized water were added continuously over a period of 4 hours. After completion of continuous addition, the reaction system was ripened at 70° C. for a further 2 hours to carry the polymerization reaction to completion.

The resulting graft polymer latex was precipitated with magnesium sulfate, dehydrated, and dried to provide a graft polymer (X) with a grafting degree of 40%.

Reference Example 5

Production of graft polymer (y)

Using 170 parts of a rubber like polymer latex (solid content 35.3%) having a weight average particle diameter of 0.15 µm as obtained in Reference Example 2 and 14 parts of acrylonitrile and except that the amount of styrene was changed to 26 parts, the amount of t-dodecylmercaptan to 0.5 part, and the amount of deionized water to 10 parts, the polymerization reaction was carried out in otherwise the same manner as Reference Example 4 to prepare a graft polymer (y) with a grafting degree of 30%.

Reference Example 6

Production of a graft polymer

Except that the amount of the rubber like polymer latex (solid content 35.3%) having a weight average particle diameter of 0.15 µm as obtained in Reference Example 2 was changed to 226 parts, the amount of acrylonitrile to 7 parts, and the amount of styrene to 13 parts, the polymerization procedure of Reference Example 5 was otherwise repeated to prepare a graft polymer with a grafting degree of 6%.

Reference Example 7

Production of a graft polymer

The procedure of Reference Example 5 was repeated except that the use of t-dodecylmercaptan was omitted to prepare a graft polymer with a grafting degree of 50%.

Reference Example 8

Production of a graft polymer

The procedure of Reference Example 5 was repeated except that the agglomerated rubber like polymer obtained in Reference Example 3 was employed to give a graft polymer with a grafting degree of 30%.

Reference Example 9

Production of copolymer (Z)

A stainless steel reactor equipped with a stirrer means was subjected to nitrogen gas purging and, then, charged with an initiator solution prepared by dissolving 0.3 part of potassium persulfate in 100 parts of deionized water and the temperature was increased to 65° C. Then, a monomer mixture consisting of 65 parts of styrene, 35 parts of acrylonitrile and 0.25 part of t-dodecylmercaptan and an emulsifier solution containing 1.5 parts of sodium oleate in 20 parts of deionized water were added continuously over a period of 4 hours for polymerization.

After completion of continuous addition, the temperature was increased to 70° C. and the reaction mixture was ripened for 2 hours to carry the reaction to completion.

The resulting copolymer latex was subjected to magnesium sulfate precipitation, dehydrated and dried to provide a powdery copolymer (Z). The acrylonitrile content of the copolymer (Z) was 33.9% and the intrinsic viscosity of the polymer was 0.75.

Reference Example 10

Production of a copolymer

The polymerization procedure of Reference Example 9 was repeated except that the amount of styrene was changed to 70 parts, the amount of acrylonitrile to 30 parts, and the amount of t-dodecylmercaptan to 0.22 part to provide a copolymer. The acrylonitrile content of the copolymer was 28.5% and the intrinsic viscosity of the copolymer was 0.75.

Reference Example 11

Production of a copolymer

The polymerization procedure of Reference Example 9 was repeated except that the amount of t-dodecylmercaptan was changed to 0.5 part to provide a copolymer. The acrylonitrile content of the copolymer was 33.6% and the intrinsic viscosity of the copolymer was 0.55.

EXAMPLES AND COMPARATIVE EXAMPLES

According to the compounding recipe shown in Tables 1–4, the graft polymers and copolymers obtained in Reference Examples were respectively mixed and melt kneaded using a 40 mm (dia.) single screw extruder at 220° C. to provide resin compositions (pellets).

The agglomeration status of the graft polymer was confirmed and the characteristics of each composition were evaluated. The results are shown in Tables 1–4.

It should be understood that the examples and comparative examples in

Tables 1 and 2 are relevant to the first aspect of the present invention and that the examples and comparative examples in.

Tables 3 and 4 are relevant to the third aspect of the present invention.

The method for confirming the status of agglomeration and the methods for evaluation of various characteristics are described below.

(1) Method for confirming the agglomeration status

A sheet was prepared from the pellets by the hot press method and the presence or absence as well as the diameter of agglomerates were determined on an electron micrograph.

(2) Notched Izod impact strength (NI)

Using a 3.5 ounce injection molding machine at a cylinder temperature setting of 220° C., a ¼ inch thick testpiece was prepared in accordance with ASTM D-256 and its NI was determined at 23° C.

(3) Processability

MFR (melt flow rate) was measured under a load of 10 kg/cm at 220° C.

(4) Thermal stability

Each sample was held in a KOKA flow tester at 260° C. for 30 minutes and the degree of subsequent discoloration was visually assessed.

o: no or slight discoloration

Δ: moderate discoloration x: severe discoloration (5) Chlorofluorocarbon resistance i) Degree of swelling The pellets were hot pressed into a 2 mm thick sheet at 220° C. and a 4 cm×2 cm testpiece was prepared from the sheet. This testpiece was immersed in HCFC-141b at −30° C. for 60 hours and the degree of swelling was calculated from the change in weight of the testpiece by means of the following equation. Degree of swelling (%)=

$$\text{Degree of swelling (\%)} = \frac{\text{Weight after immersion} - \text{weight before immersion}}{\text{Weight before immersion}} \times 100$$

The smaller the above value is, the greater is the chlorofluorocarbon resistance.

ii) Critical strain

Using a 3.5 ounce injection molding machine at a cylinder temperature setting of 220° C., a testpiece measuring 15 cm×2 cm×0.3 cm was prepared. With one end of this testpiece (T) being secured to a measuring apparatus (1) as shown in FIG. 1, a 3 cm deflection load was applied to the free end of the testpiece using a press bar (2) and the testpiece was allowed to stand in a vapor of HCFC-141b for 24 hours.

The critical strain was then calculated by means of the following equation.

$$\text{Critical strain (\%)} = \frac{3}{2} \times \frac{H \delta X}{L^3} \times 100$$

H: thickness of testpiece,

δ: amount of deflection (3 cm),

X: distance from free end to cracking point

L: Span

The larger the above value is, the greater is the chlorofluorocarbon resistance. However, the maximum critical strain value that can be measured by this method is 1.3%. The symbol [>1.3] in the table means that no crack developed in this test.

(6) Gloss

Using a 3.5 ounce injection molding machine at a cylinder temperature setting of 240° C., a testpiece measuring 10 cm×6 cm×0.3 cm was prepared and the surface gloss of the testpiece was measured in accordance with ASTM D-523.

TABLE 1

|  | Example I-1 | Example I-2 | Example I-3 | Comparative Example I-1 | Comparative Example I-2 |
| --- | --- | --- | --- | --- | --- |
| [Recipe (in parts)] | | | | | |
| Graft polymer (X) (Reference Example 4) | — | — | — | — | — |
| Graft polymer (y) (Reference Example 5) | 25.0 | 33.3 | 41.7 | 20.0 | 50.0 |
| Graft polymer (Reference Example 6) | — | — | — | — | — |
| Graft polymer (Reference Example 7) | — | — | — | — | — |
| Graft polymer (Reference Example 8) | — | — | — | — | — |
| Copolymer (Z) (Reference Example 9) | 75.0 | 66.7 | 58.3 | 80.0 | 50.0 |
| Copolymer (Reference Example 10) | — | — | — | — | — |
| Copolymer (Reference Example 11) | — | — | — | — | — |
| [Post-compounding composition] | | | | | |
| Rubber (%) | 15.0 | 20.0 | 25.0 | 12.0 | 30.0 |
| Cluster shaped agglomerates, YES or NO | YES | YES | YES | YES | YES |
| Weight average particle diameter (μm) | 1.4 | 1.5 | 1.5 | 1.2 | 1.7 |

TABLE 1-continued

|  | Example I-1 | Example I-2 | Example I-3 | Comparative Example I-1 | Comparative Example I-2 |
|---|---|---|---|---|---|
| [Characteristics] | | | | | |
| Impact strength (kg · cm/cm) | 25.6 | 43.2 | 57.4 | 14.1 | 77.3 |
| Processability (cc/10 min.) | 4.6 | 2.1 | 1.5 | 6.9 | 0.5 |
| Thermal stability (degree of discoloration) | ○ | ○ | ○ | Δ | ○ |
| Chlorofluorocarbon resistance | | | | | |
| Degree of swelling (%) | 0.9 | 1.4 | 1.5 | 0.8 | 1.8 |
| Critical strain (%) | >1.3 | >1.3 | >1.3 | 0.9 | >1.3 |

TABLE 2

|  | Comparative Example I-3 | Comparative Example I-4 | Comparative Example I-5 | Comparative Example I-6 | Comparative Example I-7 | Comparative Example I-8 |
|---|---|---|---|---|---|---|
| [Recipe (in parts)] | | | | | | |
| Graft polymer (X) (Reference Example 4) | 40.0 | — | — | — | — | — |
| Graft polymer (y) (Reference Example 5) | — | — | — | — | 33.3 | 33.33 |
| Graft polymer (Reference Example 6) | — | 25.0 | — | — | — | — |
| Graft polymer (Reference Example 7) | — | — | 33.3 | — | — | — |
| Graft polymer (Reference Example 8) | — | — | — | 33.3 | — | — |
| Copolymer (Z) (Reference Example 9) | 60.0 | 75.0 | 66.7 | 66.7 | — | — |
| Copolymer (Reference Example 10) | — | — | — | — | 66.7 | — |
| Copolymer (Reference Example 11) | — | — | — | — | — | 66.7 |
| [Post-compounding composition] | | | | | | |
| Rubber (%) | 20.0 | 20.0 | 20.0 | 20.0 | 20.0 | 20.0 |
| Cluster shaped agglomerates, YES or NO | NO | YES | NO | NO | YES | YES |
| Weight average particle diameter ($\mu$m) | 0.45 | 7.3 | 0.15 | 0.8 | 1.2 | 1.5 |
| [Characteristics] | | | | | | |
| Impact strength (kg · cm/cm) | 33.1 | 42.3 | 19.7 | 37.1 | 35.8 | 19.5 |
| Processability (cc/10 min.) | 4.3 | 2.0 | 2.1 | 2.3 | 2.1 | 5.5 |
| Thermal stability (degree of discoloration) | ○ | Δ | ○ | ○ | ○ | ○ |
| Chlorofluorocarbon resistance | | | | | | |
| Degree of swelling (%) | 2.1 | 1.8 | 2.0 | 2.0 | 5.1 | 2.3 |
| Critical strain (%) | 0.6 | 1.0 | 0.7 | 0.9 | 0.9 | 1.0 |

TABLE 3

|  | Example II-1 | Example II-2 | Comparative Example II-1 | Comparative Example II-2 | Example II-3 | Example II-4 | Comparative Example II-3 |
|---|---|---|---|---|---|---|---|
| [Recipe (in parts)] | | | | | | | |
| Graft polymer (X) (Reference Example 4) | 6.8 | 11.4 | 5.7 | 20.4 | 10.0 | 20.0 | 8.3 |
| Graft polymer (y) (Reference Example 5) | 22.7 | 19.0 | 23.6 | 11.3 | 33.3 | 25.0 | 34.7 |
| Graft polymer (Reference Example 6) | — | — | — | — | — | — | — |
| Graft polymer (Reference Example 7) | — | — | — | — | — | — | — |
| Graft polymer (Reference Example 8) | — | — | — | — | — | — | — |
| Copolymer (Z) (Reference Example 9) | 70.5 | 69.6 | 70.7 | 68.3 | 56.7 | 55.0 | 57.0 |
| Copolymer (Reference Example 10) | — | — | — | — | — | — | — |
| Copolymer (Reference Example 11) | — | — | — | — | — | — | — |
| [Post-compounding composition] | | | | | | | |
| Rubber ratio (X/Y or other graft polymer) | 1/4 | 1/2 | 1/5 | 1/0.67 | 1/4 | 1/1.5 | 1/5 |
| Rubber (%) | 17.0 | 17.0 | 17.0 | 17.0 | 25.0 | 25.0 | 25.0 |
| Cluster shaped agglomerates, YES or NO | YES | YES | YES | YES | YES | YES | YES |
| Weight average particle diameter ($\mu$m) | 1.5 | 1.4 | 1.5 | 1.4 | 1.7 | 1.6 | 1.7 |

TABLE 3-continued

|  | Example II-1 | Example II-2 | Comparative Example II-1 | Comparative Example II-2 | Example II-3 | Example II-4 | Comparative Example II-3 |
|---|---|---|---|---|---|---|---|
| [Characteristics] | | | | | | | |
| Impact strength (kg · cm/cm) | 36.5 | 34.9 | 36.9 | 28.6 | 59.3 | 54.7 | 59.1 |
| Processability (cc/10 min.) | 4.3 | 4.6 | 3.9 | 4.9 | 1.2 | 1.6 | 0.9 |
| Thermal stability (degree of discoloration) | ○ | ○ | ○ | ○ | ○ | ○ | ○ |
| Chlorofluorocarbon resistance | | | | | | | |
| Degree of swelling (%) | 1.5 | 1.8 | 1.3 | 2.3 | 1.7 | 1.8 | 1.5 |
| Critical strain (%) | >1.3 | >1.3 | >1.3 | >1.3 | >1.3 | >1.3 | >1.3 |
| Gloss (%) | 87.5 | 94.2 | 70.0 | 96.1 | 80.8 | 89.4 | 60.4 |

TABLE 4

|  | Comparative Example II-4 | Comparative Example II-5 | Comparative Example II-6 | Comparative Example II-7 | Comparative Example II-8 | Comparative Example II-9 | Comparative Example II-10 | Comparative Example II-11 |
|---|---|---|---|---|---|---|---|---|
| [Recipe (in parts)] | | | | | | | | |
| Graft polymer (X) (Reference Example 4) | 30.0 | 5.0 | 12.0 | 10.0 | 10.0 | 10.0 | 10.0 | 6.8 |
| Graft polymer (y) (Reference Example 5) | 16.7 | 16.7 | 40.0 | — | — | 33.3 | 33.3 | — |
| Graft polymer (Reference Example 6) | — | — | — | — | 25.0 | — | — | — |
| Graft polymer (Reference Example 7) | — | — | — | 33.3 | — | — | — | — |
| Graft polymer (Reference Example 8) | — | — | — | — | — | — | — | 22.7 |
| Copolymer (Z) (Reference Example 9) | 53.3 | 78.3 | 48.0 | 56.7 | 65.0 | — | — | 70.5 |
| Copolymer (Reference Example 10) | — | — | — | — | — | 56.7 | — | — |
| Copolymer (Reference Example 11) | — | — | — | — | — | — | 56.7 | — |
| [Post-compounding composition] | | | | | | | | |
| Rubber ratio (X/Y or other graft polymer) | 1/0.67 | 1/4 | 1/4 | 1/4 | 1/4 | 1/4 | 1/4 | 1/4 |
| Rubber (%) | 25.0 | 12.5 | 30.0 | 25.0 | 25.0 | 25.0 | 25.0 | 17.0 |
| Cluster shaped agglomerates, YES or NO | YES | YES | YES | NO | YES | YES | YES | NO |
| Weight average particle diameter ($\mu$m) | 1.6 | 1.2 | 1.7 | 0.15 | 6.8 | 1.5 | 1.6 | 0.8 |
| [Characteristics] | | | | | | | | |
| Impact strength (kg · cm/cm) | 51.3 | 14.7 | 76.4 | 26.9 | 56.4 | 42.5 | 31.8 | 31.2 |
| Processability (cc/10 min.) | 1.7 | 7.4 | 0.7 | 1.3 | 1.2 | 1.2 | 3.1 | 4.6 |
| Thermal stability (degree of discoloration) | ○ | x | ○ | ○ | Δ | ○ | ○ | ○ |
| Chlorofluorocarbon resistance | | | | | | | | |
| Degree of swelling (%) | 2.2 | 0.8 | 1.8 | 2.2 | 1.8 | 5.5 | 2.9 | 2.0 |
| Critical strain (%) | 1.2 | 0.6 | >1.3 | 0.6 | 1.1 | 1.1 | 1.0 | 0.8 |
| Gloss (%) | 91.1 | 94.3 | 70.4 | 95.6 | 31.7 | 84.6 | 83.1 | 79.5 |

Then, using each resin composition of the present invention, a sheet measuring 140 cm×50 cm×0.2 cm was prepared and a refrigerator inner casing of about 200 liter capacity was fabricated by the vacuum forming technique. Each casing thus obtained was installed in an iron shell outer casing and an urethane foam composition containing HCFC-141b as a blowing agent was poured in place.

The assembly thus obtained was allowed to stand in the air at 60° C. for 2 hours and, then, at room temperature for 1 hour. The assembly was then cooled to −30° C. and allowed to stand at that temperature for 2 hours and, then, at room temperature for spontaneous warming for 1 hour. The above procedure was repeated in 14 cycles and the inner casing was examined for signs of cracking or whitening. None of the inner casings had developed cracks or whitening.

What is claimed is:

1. A chlorofluorocarbon resistant resin composition characterized by comprising a graft polymer (X) obtained by polymerizing 80–20 weight % of a monomer mixture comprising 20–40 weight % of a vinyl cyanide compound and 80–60 weight % of an aromatic vinyl compound in the presence of 20–80 weight % of a rubber like polymer having a weight average particle diameter of 0.4–0.6 μm, an agglomerated graft polymer (Y) occurring in clusters having a weight average particle diameter of 0.8–2.0 μm as formed from a small particle diameter graft polymer (y) obtained in a grafting degree of 10–40 weight % by polymerizing 60–20 weight % of a monomer mixture comprising 30–45 weight % of a vinyl cyanide compound and 70–55 weight % of an aromatic vinyl compound in the presence of 40–80 weight % of a rubber like polymer having a weight average particle diameter of 0.05–0.2 μm, and a copolymer (Z) obtained by polymerizing 35–45 weight % of a vinyl cyanide compound with 65–55 weight % of an aromatic vinyl compound and having an intrinsic viscosity of 0.6–0.9, the weight ratio of the rubber like polymer in graft polymer (X) to the rubber like polymer in graft polymer (Y) being 1:1–4 and the combined total amount of said rubber like polymers being 15–25 weight % relative to the whole composition.

2. The resin composition of claim 1 further characterized in that the rubber like polymer is a conjugated diene rubber and/or an ethylene-α-olefin rubber.

3. The resin composition of claim 1 which is further characterized in that said vinyl cyanide compound is at least one member selected from the group consisting of acrylonitrile, methacrylonitrile and fumaronitrile.

4. The resin composition of claim 1 further characterized in that said aromatic vinyl compound is at least one member selected from the group consisting of styrene, α-methylstyrene, o-methylstyrene, m-methyl-styrene, p-methylstyrene, t-butylstyrene, α-methyl-vinyltoluene, dimethylstyrene, chlorostyrene, dichloro-styrene, bromostyrene, dibromostyrene, and vinyl-naphthalene.

5. A chlorofluorocarbon resistant refrigerator inner casing characterized by having been formed from the resin composition of claim 1.

* * * * *